United States Patent
Weck et al.

[11] Patent Number: 5,919,014
[45] Date of Patent: Jul. 6, 1999

[54] DEVICE FOR MACHINING AND/OR ASSEMBLING OF WORKPIECES

[75] Inventors: Manfred Weck, Aachen; Jochen Asbeck, Bergheim; Peter Leibinger; Boris Vites, both of Aachen, all of Germany

[73] Assignee: VDW Verein Duetscher Werkzeugmaschinenfabriken e.V., Frankfurt am Main, Germany

[21] Appl. No.: 09/003,062

[22] Filed: Jan. 5, 1998

Related U.S. Application Data

[63] Continuation of application No. 08/874,649, Jun. 13, 1997, abandoned.

[30] Foreign Application Priority Data

Jun. 13, 1997 [DE] Germany .............................. 19623511

[51] Int. Cl.[6] .................................................. B23C 1/12
[52] U.S. Cl. .......................... 409/201; 408/236; 409/211; 409/216; 409/235
[58] Field of Search ...................................... 409/183, 185, 409/190, 191, 201, 204, 206, 211, 216, 231, 235, 236; 408/234, 236

[56] References Cited

U.S. PATENT DOCUMENTS

| | | | |
|---|---|---|---|
| 4,512,695 | 4/1985 | Brun et al. | 409/134 |
| 4,776,749 | 10/1988 | Wanzenberg et al. | 414/680 |
| 4,787,138 | 11/1988 | Eaton et al. | 29/748 |
| 5,267,818 | 12/1993 | Marantette | 409/132 |
| 5,388,935 | 2/1995 | Sheldon | 409/201 |
| 5,401,128 | 3/1995 | Lindem et al. | 409/132 |
| 5,569,004 | 10/1996 | Marantette | 409/235 |

*Primary Examiner*—Andrea L. Pitts
*Assistant Examiner*—Christopher Kirkman
*Attorney, Agent, or Firm*—Robert W. Becker & Associates

[57] ABSTRACT

A device for manipulating workpieces has a support and linear actuators for moving the support. A coupling gear is connected to the support. The coupling gear includes at least two coupling members pivotably connected to one another. The at least two coupling members move the support in a plane of movement and lock a degree of freedom perpendicular to the plane of movement.

13 Claims, 6 Drawing Sheets a)

b)

c)

d)

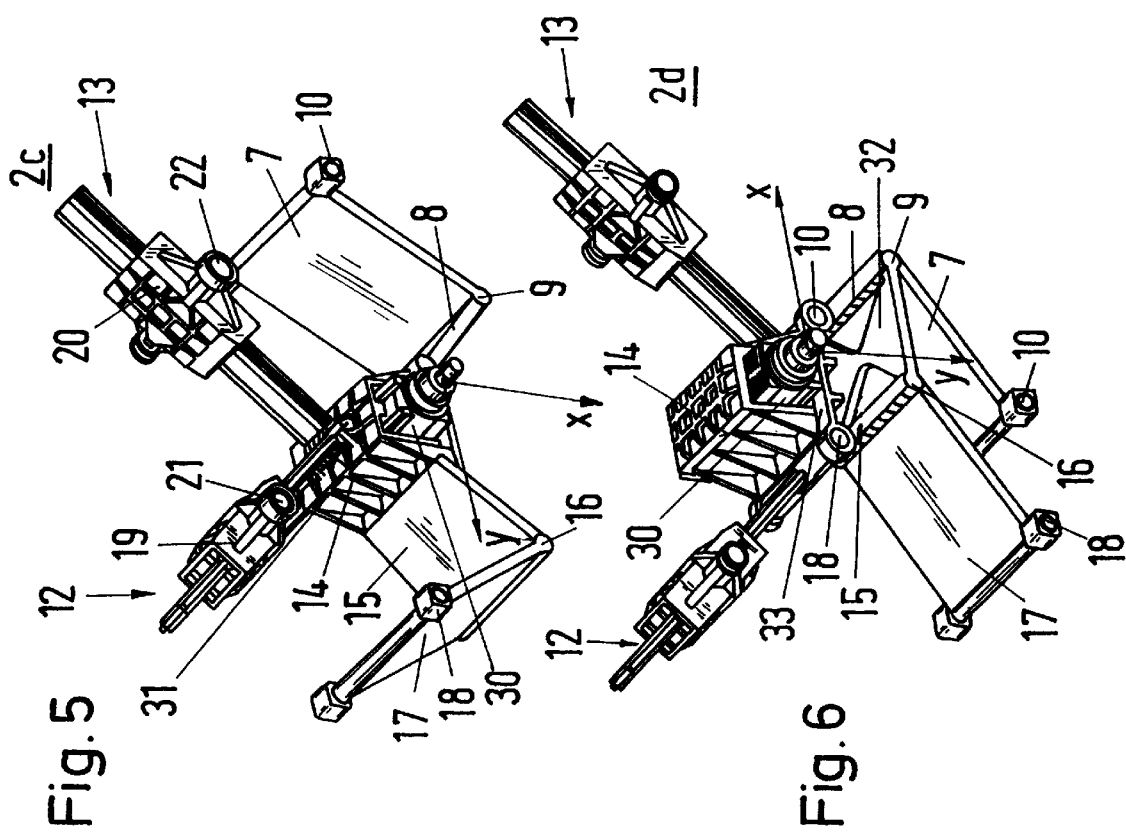
Fig. 5
Fig. 6
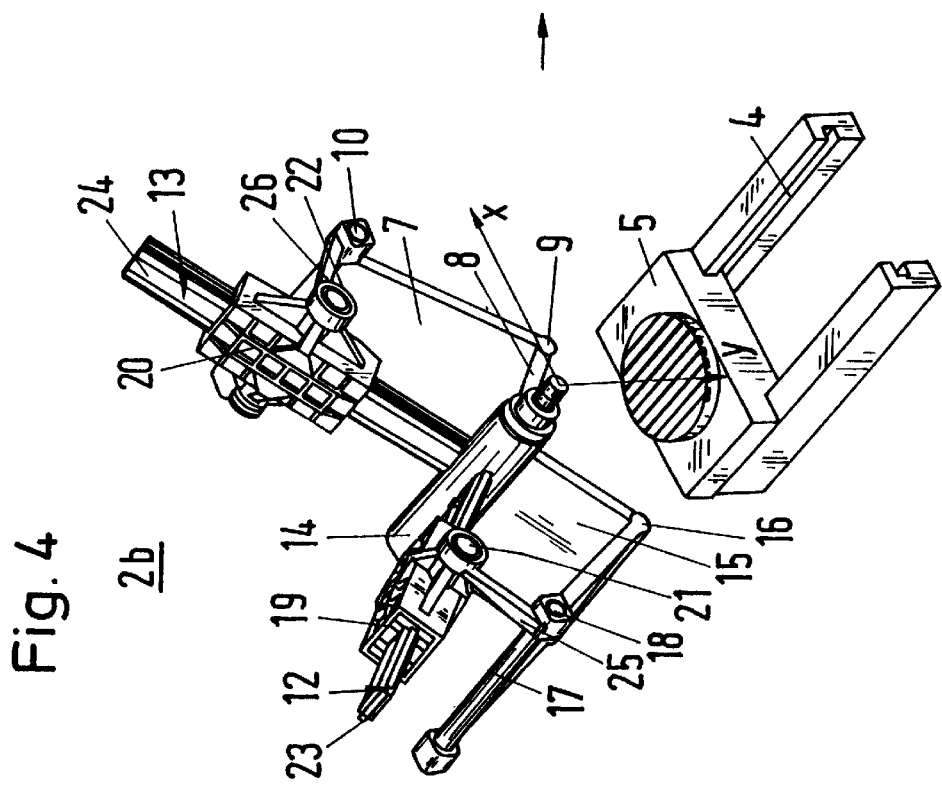
Fig. 4

DEVICE FOR MACHINING AND/OR ASSEMBLING OF WORKPIECES

This application is a continuation of Ser. No. 08/874,649, filed Jun. 13, 1997, now abandoned.

BACKGROUND OF THE INVENTION

The present invention relates to a device for manipulating, i.e., machining and/or mounting or assembling workpieces, wherein the device comprises a support that is moveable by linear drives.

Devices are known which have a frame on which a carriage is displaceably supported for movement in the Y direction. The carriage carries the drive spindle for tools. The frame is displaceable on a carriage in the Z direction while the carriage itself is displaceable in the X direction on a machine bed. Such a device is constructively complicated. Especially, considerable masses must be moved during machining of the workpiece.

It is therefore an object of the present invention to embody the aforementioned device such that it has a simple construction design and is designed such that only minimal masses must be moved.

SUMMARY OF THE INVENTION

A device for manipulating workpieces according to the present invention is primarily characterized by:

A support;

Linear actuators for moving the support;

A coupling gear connected to the support;

The coupling gear comprising at least two coupling members pivotably connected to one another;

The at least two coupling members moving the support in a plane of movement and locking a degree of freedom perpendicular to the plane of movement.

One of the coupling members is rigidly connected to the support. The linear actuators preferably engage the support.

The coupling members are preferably plates.

The linear actuators may be positioned in the plane of movement or maybe positioned angularly to the plane of movement.

The coupling gear comprises four such coupling members arranged in the shape of a W or an M. The coupling members are pivotable relative to one another about parallel pivot axes.

The plane of movement is positioned in an X-Y plane of an X-Y-Z coordinate system.

The parallel pivot axes extend in the Z direction of the X-Y-Z coordinate system.

Advantageously, the device further comprises a member for moving the workpiece in the Z direction.

The device may also comprise a center sleeve, wherein the support is in the form of a housing for receiving the center sleeve and wherein the center sleeve is linearly moveable perpendicularly to the plane of movement.

The coupling gear may comprise a parallelogram gear system. The parallelogram gear system is formed by a first and a second one of the coupling members extending perpendicularly to the plane of movement and a third and fourth one of the coupling members connected to the first and second coupling members.

The support which may support a tool but also a workpiece is moved in a plane of movement by the coupling gear with the two coupling members. The coupling gear results in a highly dynamic device with only minimal mass so that the support can be quickly moved into the desired position. Due to the minimal mass of the coupling members, it is not necessary to provide motors with high output. The coupling gear allows for movement of the support in a plane of movement and locks a degree of freedom that is perpendicular to the plane of movement. The kinematic design on which this device is based is thus a planar movement with two degrees of freedom. With the aid of auxiliary axes it can be expanded to more than these two axes.

BRIEF DESCRIPTION OF THE DRAWINGS

The object and advantages of the present invention will appear more clearly from the following specification in conjunction with the accompanying drawings in which:

FIGS. 4–6 show respectively in a perspective representation different embodiments of coupling gears of the inventive device;

DESCRIPTION OF PREFERRED EMBODIMENTS

The present invention will now be described in detail with the aid of several specific embodiments utilizing FIGS. 1–7.

Figure 1:
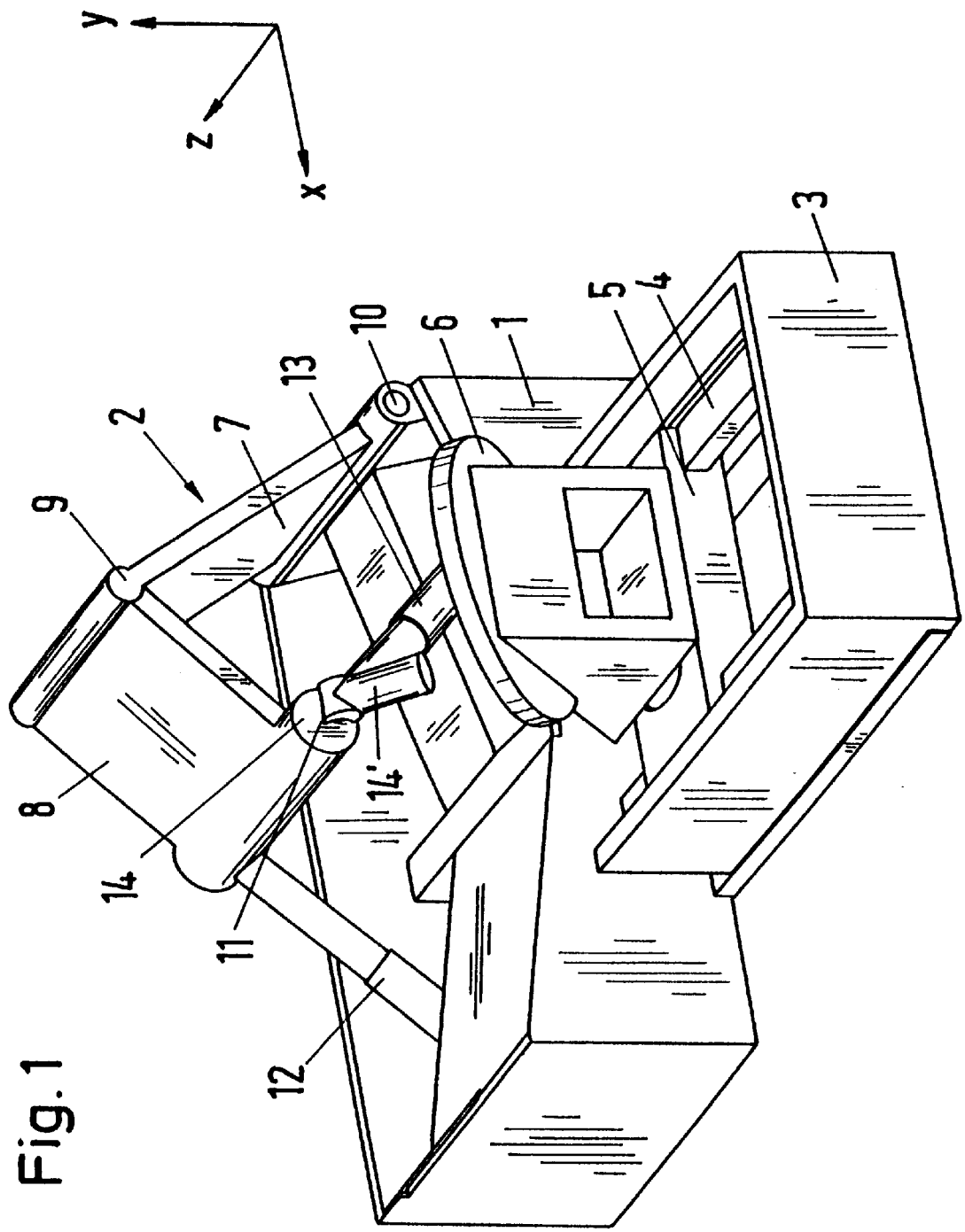
FIGS. 1 and 1a are perspective and simplified representations of a first embodiment of the inventive device showing respectively linear actuators positioned in the plane of movement and positioned angularly to the plane of movement.
Figure 1A:
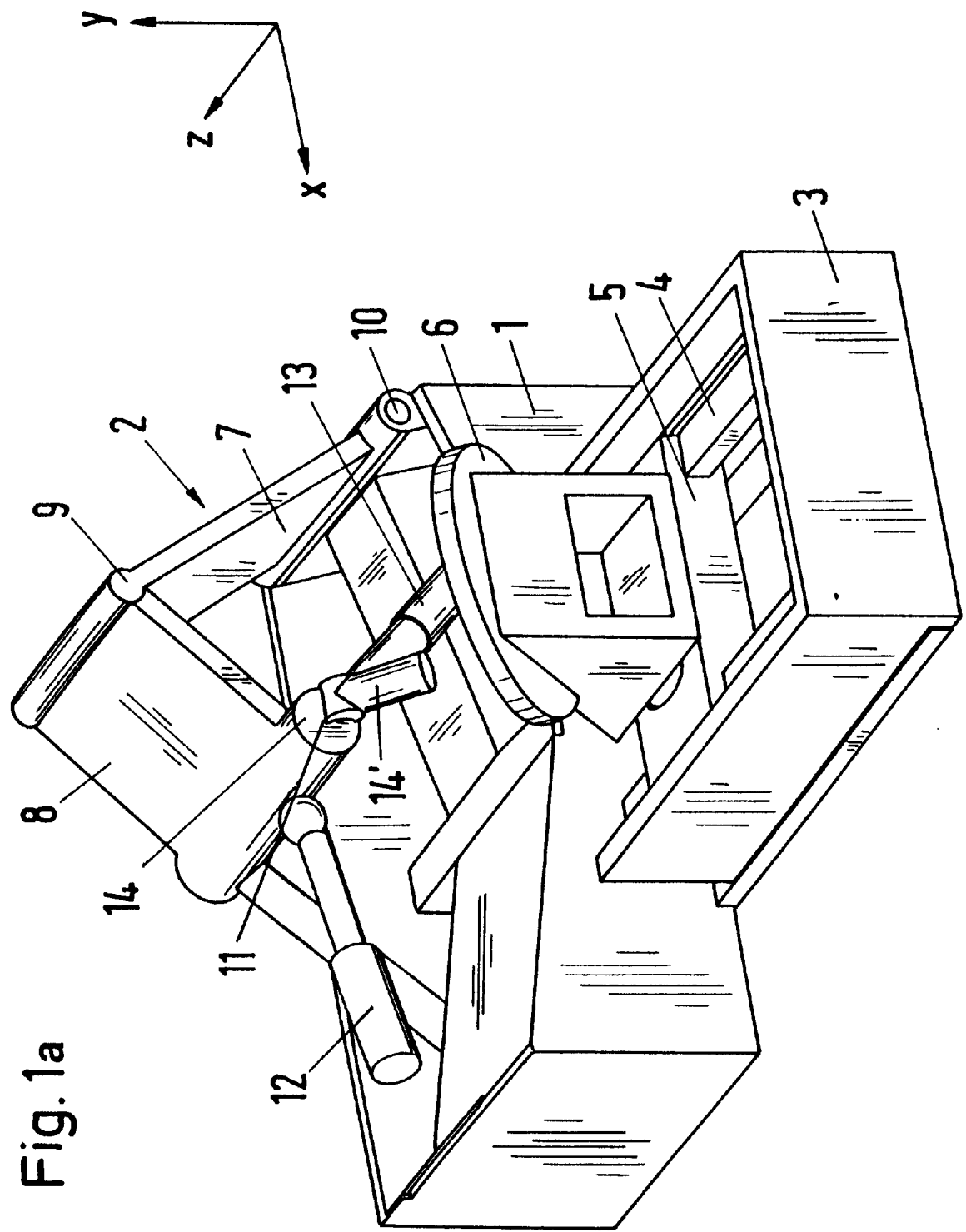
Figure 2:
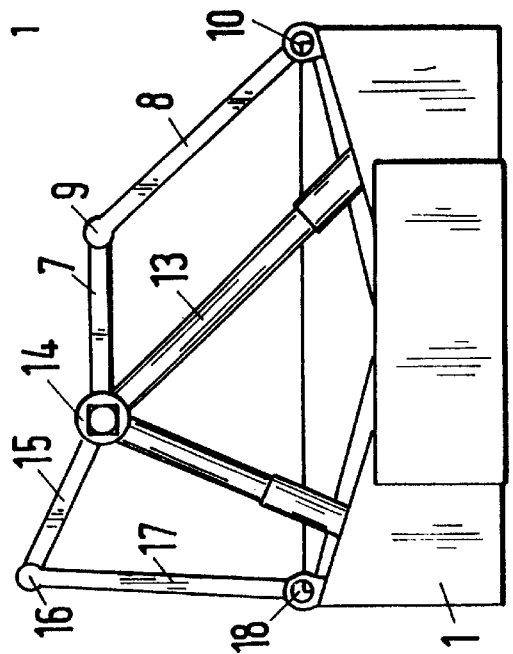
FIGS. 2a–2d show different positions of a support in a second embodiment of the inventive device.
Figure 2:
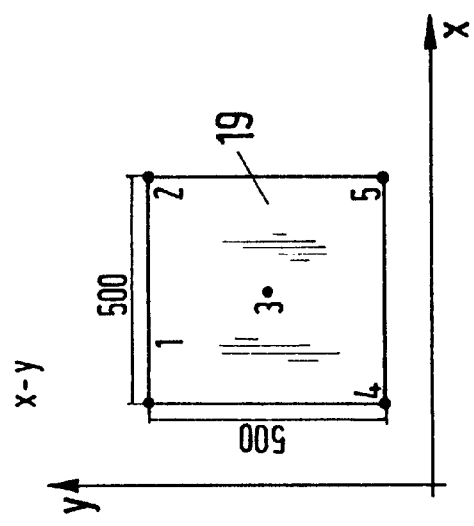
Figure 2:
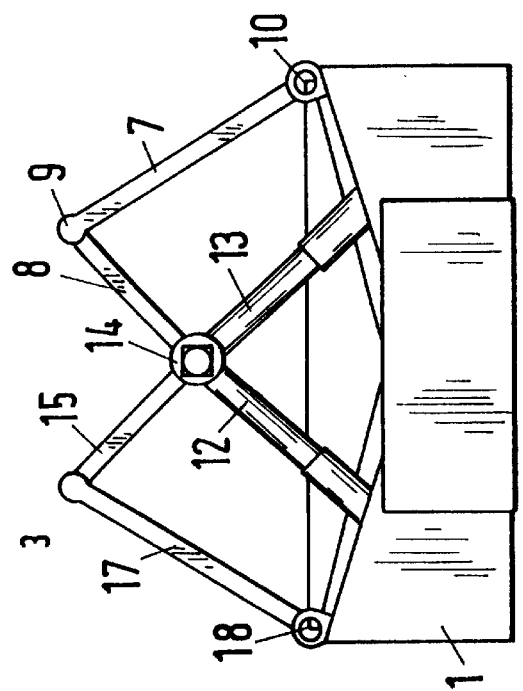
Figure 2:
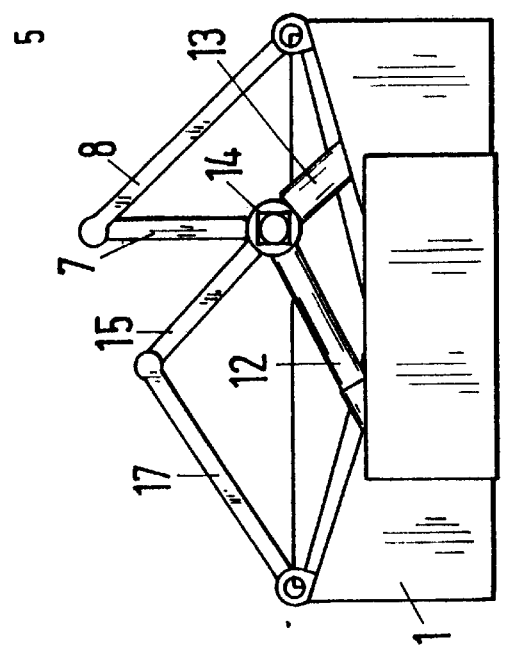

The device serves for manipulating workpieces and/or for assembling or mounting them. FIG. 1 shows a device with a frame 1 that is provided with a coupling gear 2. With this device a non-represented support can be moved in a plane of movement. The support may support a tool but also a workpiece. In the following embodiments, it is assumed that the support includes a tool.

In front of the support a workpiece table 3 with a linear guide 4 extending in the Z direction is provided along which a carriage 5 can be moved in the Z direction. A clamping plate 6 is arranged on the carriage 5 on which, in a manner known per se the workpiece to be machined can be clamped. The workpiece can be displaced or moved with the carriage 5 in the Z direction for the purpose of machining.

The coupling gear 2 has two pivotably connected coupling members 7 and 8 which at their facing edges are pivotably connected by a pivot with axis 9 extending in the Z direction.

The coupling gear 7 at the opposite edge is pivotably supported at the frame by pivot axis 10 which extends also in the Z direction.

The coupling member 8 comprises at the edge facing away from the pivot axes 9 a further parallel extending axis 11 engaged by the ends of two linear actuators 12 and 13. The other ends of the linear actuators 12, 13 are pivotably connected to the frame 1. In the shown embodiment the two linear actuators 12, 13 are positioned in the X-Y plane. Within this plane the linear actuators 12, 13 can be pivoted in a manner which will be explained in the following.

The coupling members 7, 8 are embodied such that they can be pivoted relative to one another about the pivots with axes 9 and 10. A bending of the coupling members transverse to this plane is not possible. The coupling gear 2 allows thus a planar movement of the support 14 for the tool and locks a degree of freedom perpendicular to the plane of the respective coupling members 7, 8. The coupling member 8 is rigidly connected to the support 14.

In the shown embodiment of FIG. 1, a support element 14' is connected to the support 14 which is pivotable about an axis extending in the X direction perpendicularly to the axis 11 and can also be rotated about the Z axis. This support element 14' supports the tool. In a more simplified embodiment the tool is directly connected to the support 14.

In order to provide the desired stiffness to the coupling members 7, 8 in a direction perpendicular to the plane of movement, they can, for example, be embodied as hollow bodies or plate-shaped. It is also possible to provide the coupling members 7, 8, for example, by two rods extending between the corresponding axes 9–11 which are then connected respectively by at least one transverse rod.

The linear actuators 12, 13 are, for example, cylinder-piston units. The cylinder in the shown embodiment is connected to the frame 1 while the piston with its free end is connected to the axes 11. The two linear actuators 12, 13 are positioned, relative to their connecting points at the frame 1, so as to converge and their piston rods engage ends of the axis 11. By reciprocating the piston rod, the coupling members 7, 8 are pivoted by the desired amount about the axes 9, respectively, 10. Accordingly, the support 14 which is rigidly connected to the coupling member 8 is positioned in the desired position.

Figure 3:
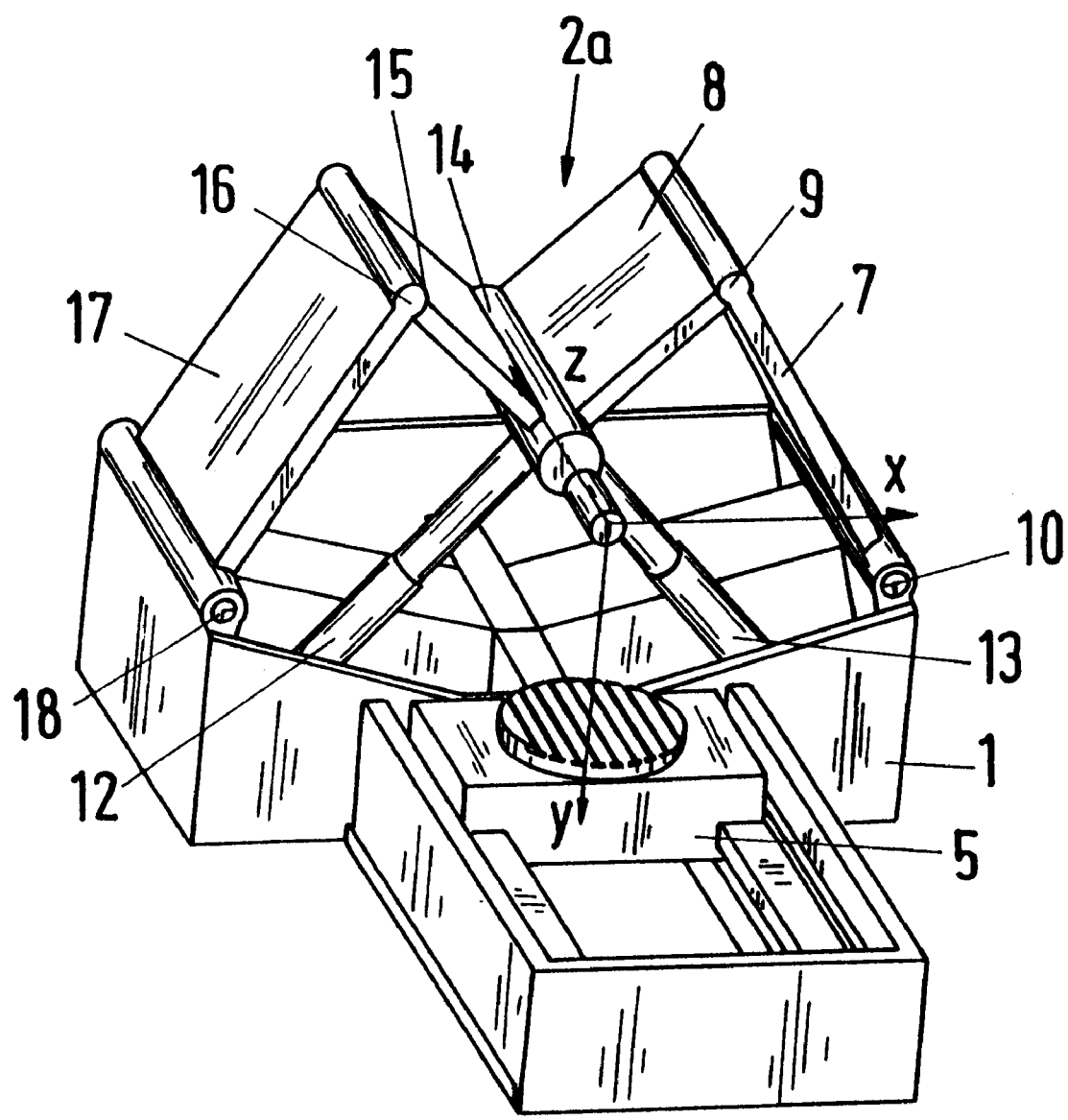
FIG. 3 shows a representation corresponding to FIG. 1 of a second embodiment of the inventive device.

FIG. 3 shows an embodiment in which the coupling gear 2a is formed by two mirror-symmetrically arranged coupling gears according to FIG. 1. The coupling gear 2a comprises accordingly the coupling members 7 and 8 which are pivotable in the afore disclosed manner about the axes 9 and 10 relative to one another and relative to the frame 1. The coupling member 8, in contrast to the embodiment according to FIG. 1, is pivotably connected to the support 14. A coupling member 15 is rigidly connected to the support 14. Advantageously, the coupling member 15 is embodied identically to the coupling member 8 and is pivotably connected to the coupling member 17 via an axis 16 extending in the Z direction. The edge of the member 15 opposite the pivot axis 16 is pivotably connected to the frame 1. The coupling member 17 can also be pivoted about the pivot with axis 18, extending in the Z direction, relative to the frame 1.

The coupling gear 2a has the shape of an M and is comprised of five coupling elements which are formed by the coupling members 7, 8, 15, 17 and the frame 1. The two linear actuators 12, 13 are identical to the previously disclosed embodiment and are connected with one end to the frame 1 and with the other end to the support 14. By actuating the linear actuator 12, 13 the support 14 is moved in the afore disclosed manner in the X-Y plane into the desired position. The coupling members 7, 8 pivot relative to one another as well as relative to the frame 1 and the support 14. The coupling member 17 is pivoted during this adjustment about the axis 18 relative to the frame 1 and about the axis 16 relative to the coupling member 15. Since the coupling member 15 is rigidly connected to the support 14, a relative movement between coupling member 15 and support 14 does not take place. As in the previously disclosed embodiment, the linear actuators 12, 13 pivot by the required amount relative to the frame 1 about the axis extending in the Z direction. Depending on the desired position of the support 14 at least one of the two linear actuators 12, 13 is extended. With a respective fine turning of the adjusting or control movement of the two linear actuators 12, 13, the support 14 can be precisely and simply displaced into the required position within the X-Y plane.

The linear actuators 12, 13 must not, as in the previously disclosed embodiments be, positioned in the X-Y plane but can also be three dimensionally arranged, i.e., can be positioned at an angle to the X-Y plane.

Due to the twin embodiment of the coupling gear 2a, a symmetrical stiffness distribution within the gear results. When the coupling members 7, 8, 15, 16, as shown in FIG. 3, are arranged mirror-symmetrically to one another, a symmetrical stiffness distribution results.

FIGS. 2a–2d show different positions of the support 14. FIG. 2a shows the working space within the X-Y plane within which the support 14 can be moved by the coupling gear 2a.

FIG. 2c shows the position of the support 14 corresponding to FIG. 3. The coupling members 7, 8, 15, 17 are in the shape of an M. The two linear drives 12, 13 diverge from their connecting locations at the support 14 in the downward direction. The support 14 in this position is centrally arranged within the working space 19 (FIG. 2a) of the device. The corresponding positions of the support 14 are indicated with reference numeral 3.

FIG. 2b shows in an exemplary manner the position of the individual members of the coupling gear 2a when the support 14 is in position 1. The linear drive 13 must be extended for this purpose in order to displace the support 14 into the position 1. The coupling members 7, 8 are pivoted relative to another during this movement about the parallel axes 9 and 10 in the Z direction and are also displaced relative to the frame 1. Since the coupling member 15 is rigidly connected to the support 14, upon this displacement of the support 14 a relative movement between it and the coupling member 15 will not occur. The coupling member 17, in this movement about the axes 16 and 18, is pivoted relative to the coupling member 15 as well as relative to the frame 1.

FIG. 2d shows in an exemplary manner the scenario in which the support 14 is displaced into the position 5. In this case, the linear actuator 13 is retracted so that support 14 is positioned in the corresponding position 5 within the X-Y plane. The coupling members 7, 8 thus perform the required pivot movements relative to one another. Between the support 14 and the coupling member 15 a relative movement does not occur because these two elements are rigidly connected to one another.

Upon movement of the support 14, the linear actuators 12, 13, if needed, can be pivoted by the required amount relative to the frame 1 as well as relative to the support 14 about the axes extending in the Z direction.

In this manner, the support 14, can be moved within the working space represented in FIG. 2a into any desired position.

Due to the stiff connection between the coupling member 15 and the support 14 the latter will experience a kinematically determined rotational movement about the Z axes upon movement in the X or Y direction. The axial or radial support of the coupling members 7, 8, 15, 17 within the other pivot points which must only allow for a rotational movement, i.e., only one degree of freedom, can be realized by rotary bearings. These rotary bearings can have any suitable embodiment.

Since the support 14 in the embodiments according to FIGS. 1 and 3 can not be displaced in the Z direction, the workpiece is displaced with the carriage 5 in the Z direction relative to the frame 1. Based on the afore described continuous movement of the support 14 within the X-Y plane the tool can be advanced into any desired position relative to the workpiece.

In order to determine the actual position of the support 14, a coordinate transformation is required because of the non-cartesian linear actuators 12, 13. It provides the coupling between the adjustment movement of the linear actuators 12, 13 and the resulting position of the support 14. When the device is embodied with a five-member coupling gear according to FIG. 3, the kinematic design between the linear actuator 12, 13 and the support 14 can be reduced to a double eccentric movement with the aid of a coupling member. The coupling member 15 rigidly connected to the support 14 describes in connection with the further coupling member 17 and the support 14 a double eccentric movement. With a coordinate transformation the actual position of the support 14 in the X-Y coordinate system can be predetermined. Due to the rigid connection between the support 14 and the coupling member 15 with such a coordinate transformation, which is known and will not be discussed in this context, the required kinematically determined rotational movement of the support 14 can be calculated. In connection with the known stationary connecting points of the two linear actuators 12, 13 at the support 14 and the pivot points at the frame 1, respectively, base 1, the resulting lengths of the linear actuators can be determined. They are extended to the calculated length so that the desired position of the support 14 in the X-Y plane is achieved.

FIG. 4 shows in an exemplary manner two linear direct drives for the linear actuators 12, 13. Such linear direct drives are known and are therefore not explained in this context. The linear direct drives 12, 13 have each a housing 19, 20 that is respectively pivotably supported at the non-represented frame. Upon actuation of the linear direct drives 12, 13 the housings 19, 20 can be pivoted about the axles 21, 22 extending in the Z direction if this is necessary. The housings 19, 20 of the linear direct drives 12, 13 can thus perform only a pivot movement relative to the frame 1. In the housings 19, 20, in a manner known per se, track-shaped runners 23 and 24 are displaceably supported. The two runners 23, 24 extend from the support 14 to which they are connected in a diverging fashion. The two linear direct drives 12, 13 are arranged in a common X-Y plane. However, they can, as has been explained in connection with the previous embodiments, be arranged spacially (three-dimensionally), i.e., at an angle to the X-Y plane. By moving the runners 23, 24 relative to the corresponding housing 19, 20, the support 14 is displaced in the afore described manner within the X-Y plane into the desired position.

The coupling member 15 of the coupling gear 2b is rigidly connected to the support 14 and pivotably connected via the pivot axes 16 to the coupling member 17. The coupling member 17 is supported by the pivot with axes 18 at the frame 1 or a corresponding base in a pivotable manner. The two coupling members 7, 8 are pivotable connected to one another by the pivot with axes 9. The coupling member 8 is, as has been described previously in connection with other embodiments, pivotably connected to the support 14. The coupling member 7 is pivotably connected by axis 10 to the frame 1 or to a base. The different axes extend parallel to one another in the Z direction.

One end of a connecting arm 25 is pivotably supported on the pivot axis 18 and the other end is pivotable about the axis 21 relative to the housing 19. The other housing 20 of the linear direct drive 13 is pivotably connected with a connecting arm 26 to the coupling member 7. The two pivot axes of the connecting arms 26 are formed by the pivots with axes 21 and 10.

In contrast to the embodiment according to FIG. 3, the coupling members 7, 8, 15, 17 are arranged in the shape of a W. The two coupling members 7, 15 extend from the support 14 in a diverging fashion downwardly, while in the embodiment according to FIG. 3 they extend from the support 14 divergingly upwardly at a slant.

Figure 7:
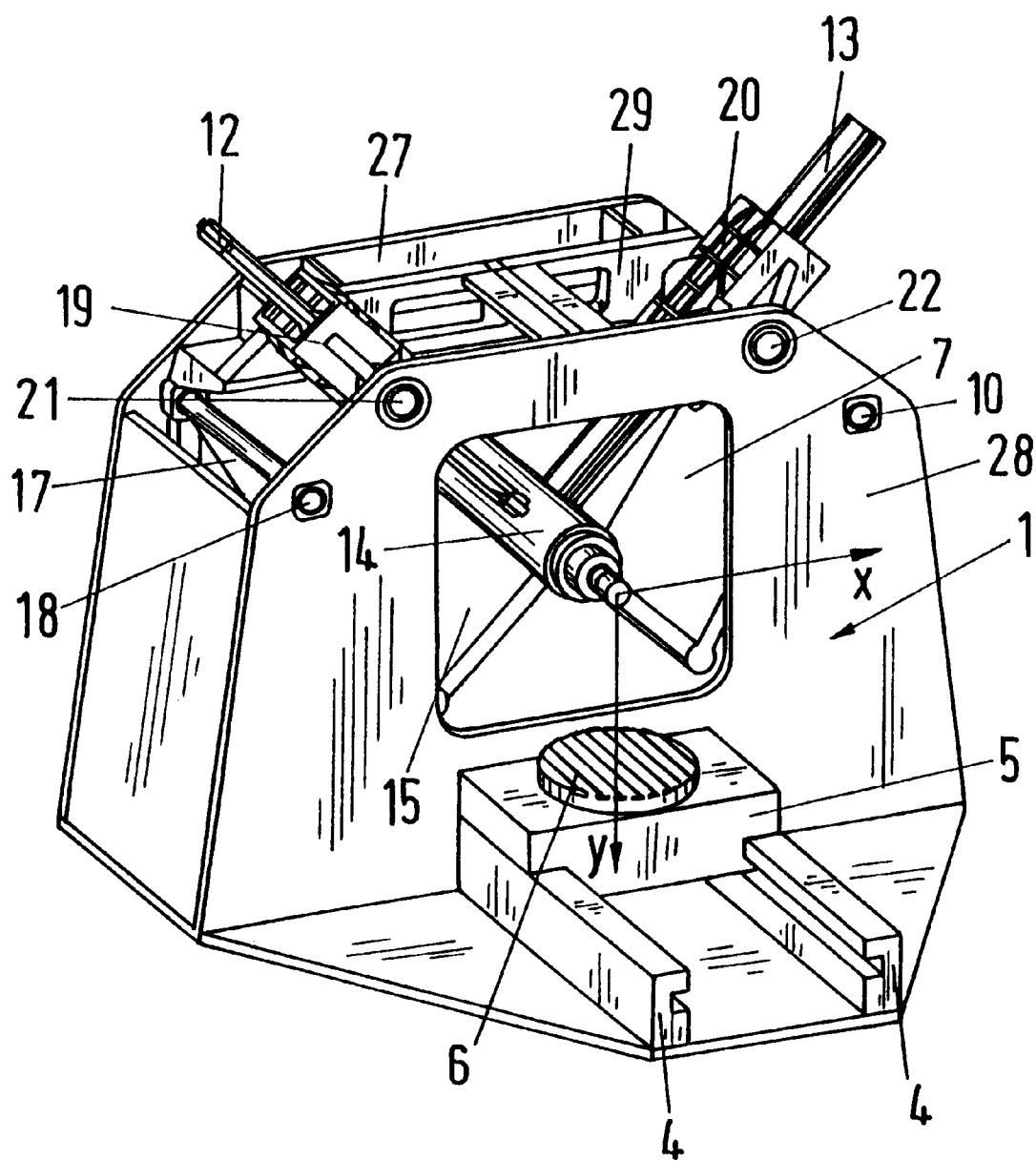
FIG. 7 shows the embodiment of FIG. 4 on a machine frame.

FIG. 7 shows the device according to FIG. 4 mounted on the frame 1. It has exterior sides or sidewalls 27, 28 as well as a partition 29. The housing 19, 20 of the linear direct drives 12, 13 are pivotably supported at the sidewall 28 as well as at the partition 29 near the upper edge. The coupling members 7, 8, 15, 17 are positioned in the area between the sidewall 28 and the partition 29 of the frame 1. The coupling members 7, 17 are pivotably connected by pivot axes 10, 18 to the sidewall 28 and the partition 29.

In this embodiment, the movement in the Z direction is provided for the workpiece. The carriage 5 can be moved by the desired amount in the Z direction along the linear guide 4 extending in the Z direction. The clamping plate 6 on the carriage 5 can be embodied so as to rotatable about an axis extending in the Y direction so that the workpiece can also be rotated about this axis for machining.

FIG. 5 shows an embodiment in which the movement in the Z direction is provided at the machine, respectively, tool side. The support 14 is embodied as a housing in which a center sleeve 30 is moveable in the Z direction. At the support 14 in the form of a housing, the coupling member 15 of the coupling gear 2c is rigidly connected. It is pivotably connected in the afore disclosed manner by the axis 16 with the coupling member 17 whereby the axis 16 extends in the Z direction. At the other side of the housing-shaped-support 14, the coupling member 8 is connected in the afore disclosed manner. It is pivotably connected by the axes 9 extending in the Z direction to the coupling member 7. In contrast to the embodiment according to the FIGS. 4 and 7, the housings 19, 20 are not connected with connecting arms to the coupling members 7, 17. The housings 19, 20 of the linear direct drives 12, 13 are supported at the frame 1 or at a base so as to be pivotable about the axes 21, 22. The two coupling members 7, 17 are again connected via axes 10, 18 in a pivotable manner to the frame 1.

The center sleeve 30 is displaced in the Z direction and can be driven in a displaceable manner by the corresponding linear actuating system. Since the center sleeve is connected to the respective machining tool, the tool can thus be displaced relative to the workpiece in the Z direction. In this case, a displaceability of the workpiece in the Z direction is not required. Of course, in this case the carriage 5 can also be provided with a linear guide 4. Then it is possible to move the tool as well as the workpiece in the Z direction.

The drive for the center sleeve 30 can be provided between the center sleeve 30 and housing-shaped support 14 as well as between the center sleeve 30 and the stationary frame, respectively, base.

In the connecting area of the coupling member 15 to the housing-shaped support 14, reinforcement ribs 31 positioned adjacent to one another are provided which provide for a great stiffness of the connected components 14, 15 in this area.

The embodiment according to FIG. 5 is a closed kinematic chain with the center sleeve 30 providing the supported Z. This device provides a kinematic concept with three degrees of freedom in the X, Y, and Z directions.

FIG. 6 shows an altered arrangement of the coupling gear 2d. The coupling members 7, 17 are connected to the frame 1, respectively, the base in a pivotable manner about the axes 10, 18 extending in the Z direction. Furthermore, the coupling members 7, 17 are connected by the axles 9, 16 in the afore described manner pivotably to the coupling members 8, 15. As in the previously described embodiments, the linear actuators 12, 13, which in the shown embodiment are again embodied as linear direct drives, engage the support 14. The support 14, as in the embodiment according to FIG. 5, is in the shape of a housing and receives the center sleeve 30 that can be moved in the Z direction.

The coupling members 7, 17 are connected with their edges having the pivot axes 9, 16 arranged thereat by coupling member 32 in a pivotable manner. The coupling member 32 extends in the X-Z plane and can be embodied according to the coupling members 7, 8, 15, 17. The support 14 is connected to a further coupling member 33 which extends between the axles 10, 18. The coupling member 33 is advantageously identical to the coupling member 32 and extends parallel thereto. With these additional coupling members 32, 33 a parallelogram embodiment is provided that ensures that the support 14 with the center sleeve 30 can be moved only in the X, respectively, Y direction but can not perform a rotational movement about the Z axes. The center sleeve 30 or the support 14 is thus exclusively moved by a translatory movement within the X-Y plane. Due to the missing rotational movement about the Z axis, the coordinate transformation for the kinematic structure is simplified because the cartesian travel information of the support 14 can be directly calculated into the coordinates of the linear actuators 12, 13.

With the linear actuators 12, 13 the support 14 can be moved by a translatory movement into any desired position within the X-Y plane in the described manner (see discussion of FIGS. 2a–2d). Via the center sleeve 30 an adjustment of the tool in the Z direction is possible.

Instead of linear direct drives for the linear actuators 12, 13 it is also possible to use worm gears or spindle-nut drives, rack and pinon drives, hydraulic drives etc. With such drives, a high machining dynamic is possible. In order to allow for short constructive lengths of the linear actuators 12, 13, they can be embodied as telescopic arrangements.

When an spindle-nut drive is used as the linear actuators 12, 13 worm gears are used, the rotational movement of the drives can be directly transformed via the spindle into a translatory movement. For such drives, in general, the threaded spindle is rotatably support so that a spindle nut is linearly displaced thereon. However, it is also possible to provide the driving action for such drives by the spindle nut. Then the threaded spindle is linearly moved. Also, a combined torque introduction via the threaded spindle as well as the spindle nut is possible. This has the advantage that the rpm of the threaded drive can be substantially above the critical rpm of the threaded spindle. In such a case, very high displacement speeds can be achieved.

Due to the simple construction of the coupling gear and the possibilities for using standard elements as bearings and axle drives, the inventive concept takes into account manufacturing and assembly considerations as well as cost aspects. A substantial advantage of the coupling drives is there minimal moved mass which is substantially based on the fact that X and Y axes do not support one another. The masses of the coupling members 7, 8, 15, 17 are not subject to translatory movement but are only pivoted about the respective instantaneous center of rotation.

In the represented and disclosed embodiments, the two linear actuators 12, 13 are used for the movement of the support 14 in the X-Y plane. Instead of these linear actuators it is also possible to use rotational drives which can be provided, for example, at the axes 10, 18 of the coupling members 7, 17. Via such rotational drives these coupling members 7, 17 are directly pivoted so that the desired displacement of the support 14 in the X-Y plane can also be performed. It is essential in regard to the coupling gear that they are of a stiff construction so that they can be pivoted only about the axes positioned in the Z direction relative to one another as well as relative to the frame 1, respectively, the support 14. This results in a very simple guiding system and especially in a very high stiffness of the device.

The present invention is, of course, in no way restricted to the specific disclosure of the specifications, and drawings, but also encompasses any modifications within the scope of the appended claims.

What I claim is:

1. A device for manipulating workpieces, said device comprising:

a support;

linear actuators for moving said support;

a coupling gear connected to said support;

said coupling gear comprising at least two coupling members pivotably connected to one another;

said at least two coupling members constraining the motion of said support in a plane of movement and locking a degree of freedom perpendicular to said plane of movement, wherein one of said coupling members is rigidly connected to said support.

2. A device according to claim 1, wherein said linear actuators engage said support.

3. A device according to claim 1, wherein said coupling members are plates.

4. A device according to claim 1, wherein said linear actuators are positioned in said plane of movement.

5. A device according to claim 1, wherein said linear actuators are positioned angularly to said plane of movement.

6. A device according to claim 1, wherein said coupling gear comprises four of said coupling members arranged in the shape of a W or an M.

7. A device according to claim 6, wherein said coupling members are pivotable relative to one another about parallel pivot axes.

8. A device according to claim 7, wherein said plane of movement is positioned in an X-Y plane of an X-Y-Z coordinate system.

9. A device according to claim 8, wherein said parallel pivot axes extend in a Z direction of said X-Y-Z coordinate system.

10. A device according to claim 1, wherein said plane of movement is positioned in an X-Y plane of an X-Y-Z coordinate system, said device further comprising a member for moving a workpiece in a Z direction of said X-Y-Z coordinate system.

11. A device according to claim 1, further comprising a center sleeve, wherein said support is a housing for receiving said center sleeve and wherein said center sleeve is linearly moveable perpendicularly to said plane of movement.

12. A device according to claim 1, wherein said coupling gear comprises a parallelogram gear system.

13. A device according to claim 12, wherein said parallelogram gear system is formed by a first and a second one of said coupling members extending perpendicular to said plane of movement and a third and fourth one of said coupling members connected to said first and second ones of said coupling members.

* * * * *

UNITED STATES PATENT AND TRADEMARK OFFICE
CERTIFICATE OF CORRECTION

PATENT NO. : 5,919,014
DATED : July 6, 1999
INVENTOR(S) : Manfred Weck, et. al.

It is certified that error appears in the above-identified patent and that said Letters Patent is hereby corrected as shown below:

Title page, item [30]Foreign Application Priority Data should read --

Jun. 13, 1996    [DE]    Germany.....................19623511--

Signed and Sealed this

Fourteenth Day of December, 1999

Attest:

Attesting Officer

Q. TODD DICKINSON

Acting Commissioner of Patents and Trademarks